United States Patent
Joly et al.

(10) Patent No.: US 11,178,129 B2
(45) Date of Patent: Nov. 16, 2021

(54) MONITORING ACCESS OF A SHARED MATERIAL VIA UNIQUE LINKS

(71) Applicant: salesforce.com, inc., San Francisco, CA (US)

(72) Inventors: Damien Joly, Piedmont, CA (US); Madeleine Mary Gill, San Francisco, CA (US)

(73) Assignee: salesforce.com, inc., San Francisco, CA (US)

(*) Notice: Subject to any disclaimer, the term of this patent is extended or adjusted under 35 U.S.C. 154(b) by 356 days.

(21) Appl. No.: 16/259,132

(22) Filed: Jan. 28, 2019

(65) Prior Publication Data

US 2020/0244641 A1  Jul. 30, 2020

(51) Int. Cl.
*H04L 29/06* (2006.01)
*H04L 9/08* (2006.01)
*G06F 16/176* (2019.01)
*G06F 16/93* (2019.01)

(52) U.S. Cl.
CPC ........ *H04L 63/0807* (2013.01); *G06F 16/176* (2019.01); *G06F 16/94* (2019.01); *H04L 9/0866* (2013.01)

(58) Field of Classification Search
CPC . H04L 63/0807; H04L 9/0866; G06F 16/176; G06F 16/94
See application file for complete search history.

(56) References Cited

U.S. PATENT DOCUMENTS

| | | | |
|---|---|---|---|
| 7,730,478 B2 | 6/2010 | Weissman | |
| 7,779,039 B2 | 8/2010 | Weissman et al. | |
| 10,459,941 B2 | 10/2019 | Gamble et al. | |
| 2008/0147813 A1* | 6/2008 | Damm | H04L 51/34 709/206 |
| 2011/0072077 A1* | 3/2011 | Tomkow | H04L 51/30 709/203 |
| 2012/0284347 A1* | 11/2012 | Cohen | H04L 63/04 709/206 |
| 2016/0234267 A1* | 8/2016 | Hebbar | H04N 21/8586 |
| 2018/0359222 A1* | 12/2018 | Hathaway | H04L 63/168 |
| 2019/0140995 A1 | 5/2019 | Roller et al. | |

* cited by examiner

*Primary Examiner* — Shin-Hon (Eric) Chen
(74) *Attorney, Agent, or Firm* — Haynes and Boone, LLP

(57) ABSTRACT

A system and corresponding method are provided for monitoring access of shared material stored in a system storage. The system includes a memory containing machine readable medium storing machine executable code and one or more processors coupled to the memory. The one or more processors are configurable to execute the machine executable code to cause the one or more processors to: receive an instruction to generate a plurality of messages, each message for providing a respective recipient with access to the shared material; for each message, generate a respective link to the shared material, wherein the respective link is unique and associated with the particular message; and monitor access to the shared material by each message recipient via the respective unique link.

12 Claims, 5 Drawing Sheets

MONITORING ACCESS OF A SHARED MATERIAL VIA UNIQUE LINKS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to database systems, and more specifically to a system and method for monitoring access of a shared material via unique links.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Computer and software development is evolving away from the client-server model toward network-based processing systems that provide access to data and services via the Internet or other networks. In contrast to traditional systems that host networked applications on dedicated server hardware, a "cloud" computing model allows applications to be provided over the network "as a service" supplied by an infrastructure provider. The infrastructure provider typically abstracts the underlying hardware and other resources used to deliver a user-developed application so that a user (e.g., consumer of cloud-based services) no longer needs to operate and support dedicated server hardware. The cloud computing model can often provide substantial cost savings to the user over the life of the application because the user no longer needs to provide dedicated network infrastructure, electrical and temperature controls, physical security and other logistics in support of dedicated server hardware.

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.). In one example, the cloud platform may support customer relationship management (CRM) solutions. This may include support for sales, service, marketing, community, analytics, applications, and the Internet of Things (IoT).

Figure 1:
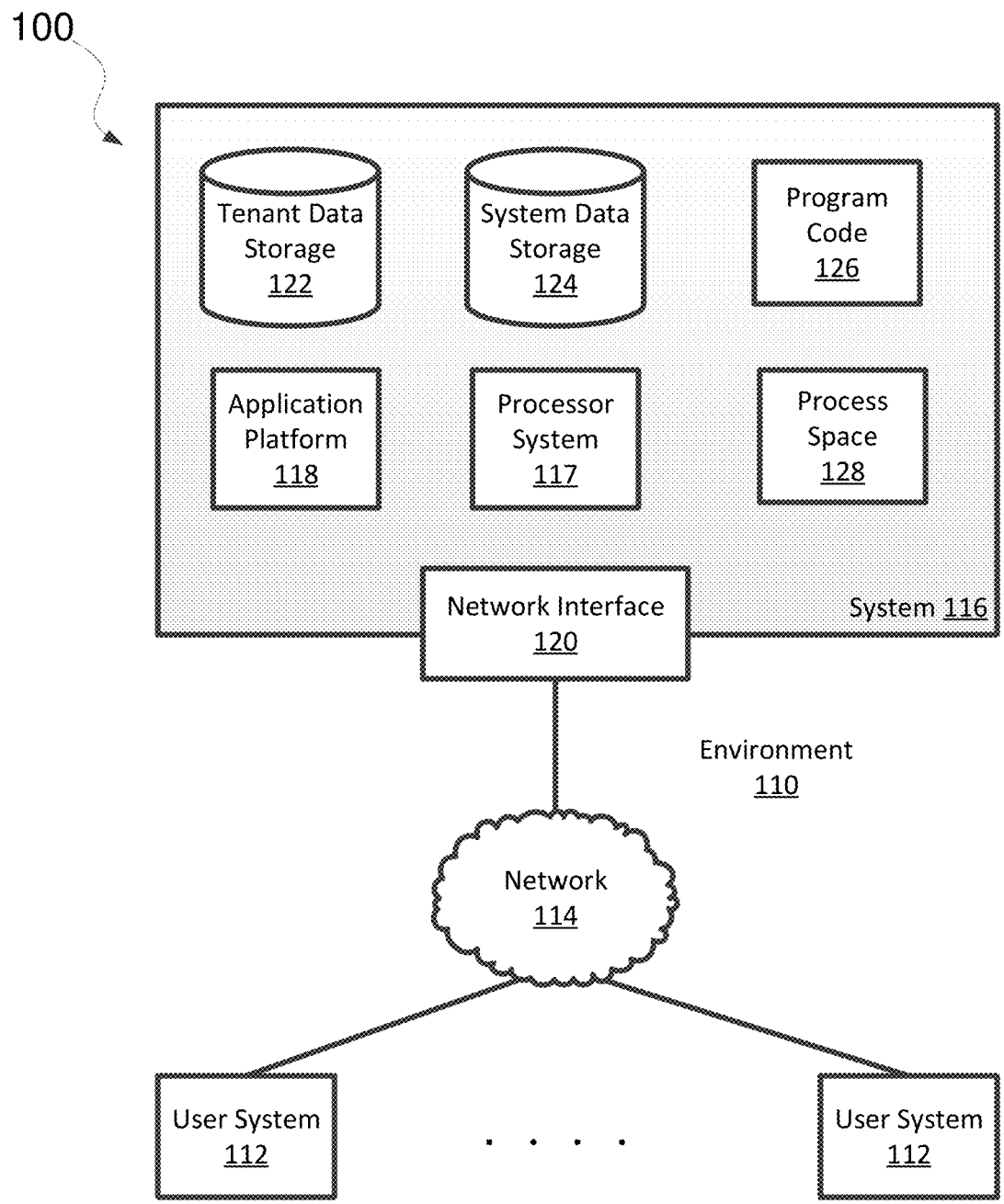
FIG. 1 illustrates a block diagram of an example environment according to some embodiments.

In the figures, elements having the same designations have the same or similar functions.

DETAILED DESCRIPTION

This description and the accompanying drawings that illustrate aspects, embodiments, implementations, or applications should not be taken as limiting—the claims define the protected invention. Various mechanical, compositional, structural, electrical, and operational changes may be made without departing from the spirit and scope of this description and the claims. In some instances, well-known circuits, structures, or techniques have not been shown or described in detail as these are known to one skilled in the art. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Overview

CRM systems allow users to create and utilize information relevant to business relationships. For instance, a CRM system may allow users to create, view, edit, modify, and otherwise utilize information regarding customers or potential customers, contact with the customers, sales made to customers, customer support information, marketing information, and other types of information that may be relevant to a business relationship or potential business relationship. A user of a CRM system (e.g., sales representative) may want to share the same content or material (e.g., a sales opportunity, a follow up correspondence, a proposal, or pitch) with multiple potential recipients (e.g., different customers, clients, or prospects; or different people at the same customer, client, or prospect). This content or material can be stored or maintained in the CRM system (e.g., Salesforce Content Repository) and accessible via a suitable link that is emailed, texted, or the like, to each recipient. Not all potential recipients are equally situated. For example, only one or two, out of many, may have decision-making authority to act on (e.g., accept or reject) a proposal. In such cases, the CRM user would prefer to know which potential recipients actually accessed the shared content or material, how many times, how long, etc. However, with existing systems, such tracking or monitoring is not possible.

To address this problem, the present disclosure abstracts the creation of links to files or materials to be shared. In particular, the present disclosure provides for the creation of separate or individualized links to the shared content, material, information, or file. Each individualized link is included in the email, text, or other message, sent to a respective recipient by the CRM user, thereby associating that link with the respective recipient. While all links direct or take the respective recipients to the same shared content, file, or material stored or maintained in the CRM, access by each recipient can be tracked by monitoring activity occurring through the respective individualized link. In this way, the CRM user understands who is previewing or downloading the shared content or materials, how long, how often, etc. The CRM user can then act on this, for example, by sending follow up emails, thereby potentially increasing the chance of making a sale, closing a transaction, landing a deal, etc. In some embodiments, the link creation logic or capability is provided or initiated from a user interface add-on (e.g., Salesforce UI) displayed within a message service provider (e.g. Outlook, Gmail, and/or the like).

Example Environment

The system of the present disclosure can include, incorporate, or operate in conjunction with or in the environment of a multi-tent cloud-based architecture.

Multi-tenant cloud-based architectures have been developed to improve collaboration, integration, and community-based cooperation between customer tenants without sacrificing data security. Generally speaking, multi-tenancy refers to a system where a single hardware and software platform simultaneously supports multiple user groups (also referred to as "organizations" or "tenants") from a common data storage element (also referred to as a "multi-tenant database"). The multi-tenant design provides a number of advantages over conventional server virtualization systems. First, the multi-tenant platform operator can often make improvements to the platform based upon collective information from the entire tenant community. Additionally, because all users in the multi-tenant environment execute applications within a common processing space, it is relatively easy to grant or deny access to specific sets of data for any user within the multi-tenant platform, thereby improving collaboration and integration between applications and the data managed by the various applications. The multi-tenant architecture therefore allows convenient and cost effective sharing of similar application features between multiple sets of users.

FIG. 1 illustrates a block diagram of an example environment 110 wherein systems and methods for managing and using access credentials for a service provider might be employed, and which may be used to implement embodiments described herein. Environment 110 may include user systems 112, network 114, system 116, processor system 117, application platform 118, network interface 120, tenant data storage 122, system data storage 124, program code 126, and process space 128 for executing database system processes and tenant-specific processes, such as running applications as part of an application hosting service. In other embodiments, environment 110 may not have all of the components listed and/or may have other elements instead of, or in addition to, those listed above.

In some embodiments, the environment 110 is an environment in which an on-demand database service exists. A user system 112 may be any machine or system that is used by a user to access a database user system. For example, any of user systems 112 can be a handheld computing device, a mobile phone, a laptop computer, a notepad computer, a work station, and/or a network of computing devices. As illustrated in FIG. 1 (and in more detail in FIG. 2) user systems 112 might interact via a network 114 with an on-demand database service, which is system 116.

An on-demand database service, such as that which can be implemented using the system 116, is a service that is made available to users outside of the enterprise(s) that own, maintain or provide access to the system 116. As described above, such users do not need to necessarily be concerned with building and/or maintaining the system 116. Instead, resources provided by the system 116 may be available for such users' use when the users need services provided by the system 116—e.g., on the demand of the users. Some on-demand database services may store information from one or more tenants stored into tables of a common database image to form a multi-tenant database system (MTS). Accordingly, the "on-demand database service 116" and the "system 116" will be used interchangeably herein. The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image may include one or more database objects. A relational data base management system (RDBMS) or the equivalent may execute storage and retrieval of information against the data base object(s).

The application platform 118 may be a framework that allows the applications of system 116 to run, such as the hardware and/or software infrastructure, e.g., the operating system. In an embodiment, on-demand database service 116 may include an application platform 118 that enables creating, managing, and executing one or more applications developed by the provider of the on-demand database service, users accessing the on-demand database service via user systems 112, or third party application developers accessing the on-demand database service via user systems 112.

The users of user systems 112 may differ in their respective capacities, and the capacity of a particular user system 112 might be entirely determined by permissions (permission levels) for the current user. For example, where a salesperson is using a particular user system 112 to interact with system 116, that user system has the capacities allotted to that salesperson. However, while an administrator is using that user system 112 to interact with system 116, that user system 112 has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

The network 114 is any network or combination of networks of devices that communicate with one another. For example, the network 114 can be any one or any combination of a local area network (LAN), wide area network (WAN), telephone network, wireless network, point-to-point network, star network, token ring network, hub network, or other appropriate configuration. As the most common type of computer network in current use is a transfer control protocol and Internet protocol (TCP/IP) network, such as the global inter network of networks often referred to as the "Internet" with a capital "I" that network will be used in many of the examples herein. However, it should be understood that the networks that the present invention might use are not so limited, although TCP/IP is a frequently implemented protocol.

The user systems 112 might communicate with system 116 using TCP/IP and, at a higher network level, use other common Internet protocols to communicate. Such as hypertext transfer protocol (HTTP), file transfer protocol (FTP), Andrew file system (AFS), wireless application protocol (WAP), etc. In an example where HTTP is used, user system 112 might include an HTTP client commonly referred to as a "browser" for sending and receiving HTTP messages to and from an HTTP server at system 116. Such an HTTP server might be implemented as the sole network interface between system 116 and network 114, but other techniques might be used as well or instead. In some implementations, the interface between system 116 and network 114 includes load sharing functionality, such as round-robin HTTP request distributors to balance loads and distribute incoming HTTP requests evenly over a plurality of servers. At least for the users that are accessing that server, each of the plurality of servers has access to the MTS data; however, other alternative configurations may be used instead.

In some embodiments, the system 116, shown in FIG. 1, implements a web-based customer relationship management (CRM) system. For example, in one embodiment, system 116 includes application servers configured to implement and execute CRM software applications as well as provide related data, code, forms, webpages and other information to and from user systems 112 and to store to, and retrieve from, a database system related data, objects, and web page content. With a multi-tenant system, data for multiple tenants may be stored in the same physical database object. However, tenant data typically is arranged so that data of one tenant is kept logically separate from that of other tenants so that one tenant does not have access to another tenant's data, unless such data is expressly shared. In certain embodiments, the system 116 implements applications other than, or in addition to, a CRM application. For example, system 16 may provide tenant access to multiple hosted (standard and custom) applications, including a CRM application. User (or third party developer) applications, which may or may not include CRM, may be supported by the application platform 118, which manages creation, storage of the applications into one or more database objects, and executing of the applications in a virtual machine in the process space of the system 116.

One arrangement for elements of the system 116 is shown in FIG. 1, including the network interface 120, the application platform 118, the tenant data storage 122 for tenant data 123, the system data storage 124 for system data 125 accessible to system 116 and possibly multiple tenants, the program code 126 for implementing various functions of the system 116, and the process space 128 for executing MTS system processes and tenant-specific processes, such as running applications as part of an application hosting service. Additional processes that may execute on system 116 include database indexing processes.

Several elements in the system shown in FIG. 1 include conventional, well-known elements that are explained only briefly here. For example, each of the user systems 112 could include a desktop personal computer, workstation, laptop, notepad computer, PDA, cell phone, or any wireless access protocol (WAP) enabled device or any other computing device capable of interfacing directly or indirectly to the Internet or other network connection. Each of the user systems 112 typically runs an HTTP client, e.g., a browsing program, such as Microsoft's Internet Explorer browser, Netscape's Navigator browser, Opera's browser, or a WAP-enabled browser in the case of a cell phone, notepad computer, PDA or other wireless device, or the like, allowing a user (e.g., subscriber of the multi-tenant database system) of the user systems 112 to access, process, and view information, pages, and applications available to it from the system 116 over the network 114. Each of the user systems 112 also typically includes one or more user interface devices, such as a keyboard, a mouse, trackball, touch pad, touch screen, pen or the like, for interacting with a graphical user interface (GUI) provided by the browser on a display (e.g., a monitor screen, liquid crystal display (LCD) monitor, light emitting diode (LED) monitor, organic light emitting diode (OLED) monitor, etc.) in conjunction with pages, forms, applications, and other information provided by the system 116 or other systems or servers. For example, the user interface device can be used to access data and applications hosted by system 116, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each of the user systems 112 and all of its components are operator configurable using applications, such as a browser, including computer code run using a central processing unit such as an Intel Pentium® processor or the like. Similarly, system 116 (and additional instances of an MTS, where more than one is present) and all of their components might be operator configurable using application(s) including computer code to run using a central processing unit such as the processor system 117, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring the system 116 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a read only memory (ROM) or random-access memory (RAM), or provided on any media capable of storing program code, such as any type of rotating media including floppy disks, optical discs, digital versatile disk (DVD), compact disk (CD), microdrive, and magneto-optical disks, and magnetic or optical cards, nano-systems (including molecular memory integrated circuits (ICs)), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, virtual private network (VPN), LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun MicroSystems, Inc.).

According to one embodiment, the system 116 is configured to provide webpages, forms, applications, data and media content to the user (client) systems 112 to support the access by the user systems 112 as tenants of the system 116. As such, the system 116 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., object oriented data base management system (OODBMS) or rational database management system (RDBMS)) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 2:
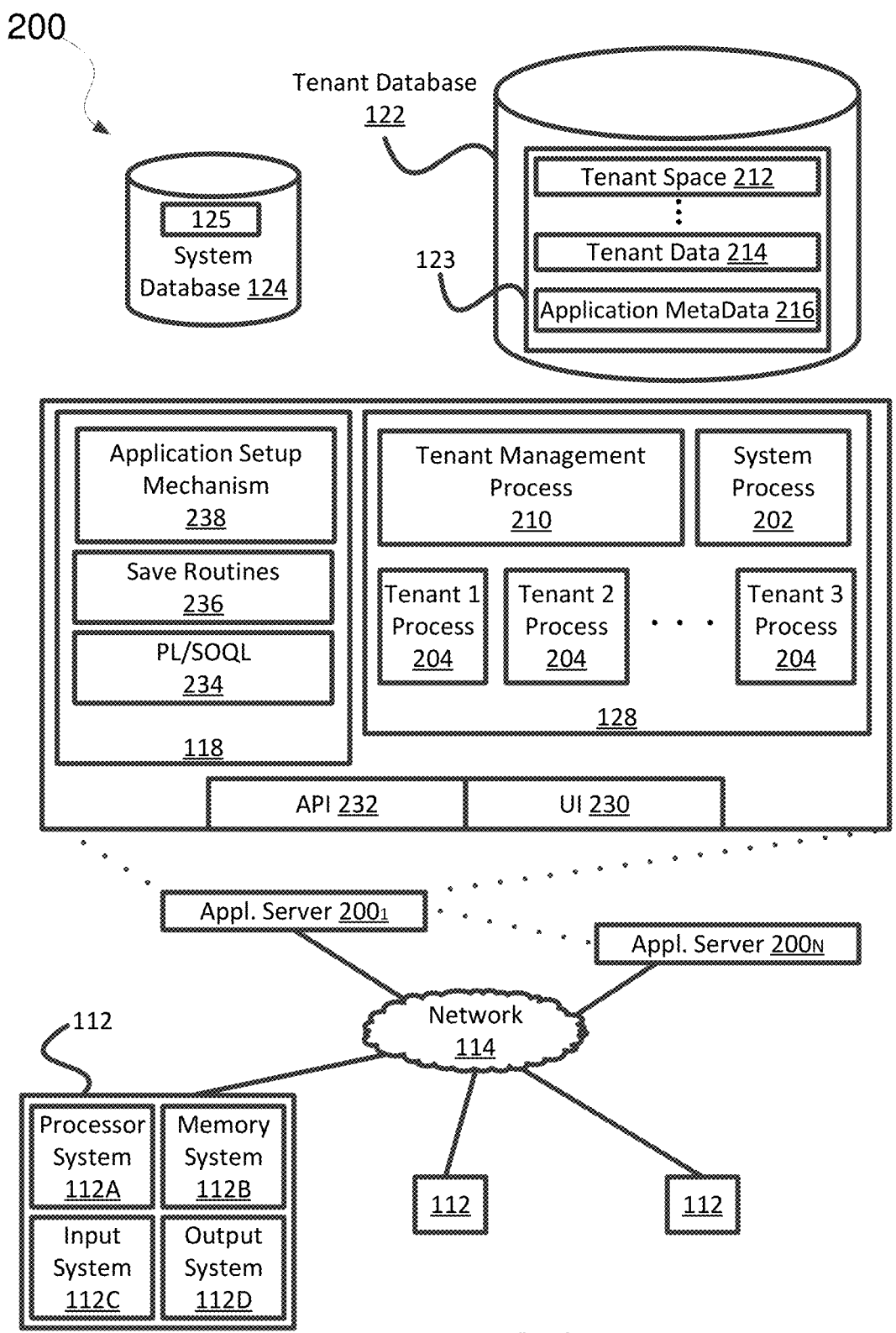
FIG. 2 illustrates a block diagram of another example environment according to some embodiments.

FIG. 2 also illustrates the environment 110, which may be used to implement embodiments described herein. FIG. 2 further illustrates elements of system 116 and various interconnections, according to some embodiments. FIG. 2 shows that each of the user systems 112 may include a processor system 112A, a memory system 112B, an input system 112C, and an output system 112D. FIG. 2 shows the network 114 and the system 116. FIG. 2 also shows that the system 116 may include the tenant data storage 122, the tenant data 123, the system data storage 124, the system data 125, a user interface (UI) 230, an application program interface (API) 232, a PL/Salesforce.com object query language (PL/SOQL) 234, save routines 236, an application setup mechanism 238, applications servers $200_1$-$200_N$, a system process space 202, tenant process spaces 204, a tenant management process space 210, a tenant storage area 212, a user storage 214, and application metadata 216. In other embodiments, environment 110 may not have the same elements as those listed above and/or may have other elements instead of, or in addition to, those listed above.

The user systems 112, the network 114, the system 116, the tenant data storage 122, and the system data storage 124 were discussed above in FIG. 1. Regarding the user systems 112, the processor system 112A may be any combination of one or more processors. The memory system 112B may be any combination of one or more memory devices, short term, and/or long term memory. The input system 112C may be any combination of input devices, such as one or more keyboards, mice, trackballs, scanners, cameras, and/or interfaces to networks. The output system 112D may be any combination of output devices, such as one or more monitors, printers, and/or interfaces to networks. As shown in FIG. 2, the system 116 may include the network interface 120 (of FIG. 1) implemented as a set of HTTP application servers 200, the application platform 118, the tenant data storage 122, and the system data storage 124. Also shown is system process space 202, including individual tenant process spaces 204 and the tenant management process space 210. Each application server 200 may be configured to access tenant data storage 122 and the tenant data 123 therein, and the system data storage 124 and the system data 125 therein to serve requests of the user systems 112. The tenant data 123 might be divided into individual tenant storage areas 212, which can be either a physical arrangement and/or a logical arrangement of data. Within each tenant storage area 212, the user storage 214 and the application metadata 216 might be similarly allocated for each user. For example, a copy of a user's most recently used (MRU) items might be stored to the user storage 214. Similarly, a copy of MRU items for an entire organization that is a tenant might be stored to the tenant storage area 212. The UI 230 provides a user interface and the API 232 provides an application programmer interface to the system 116 resident processes and to users and/or developers at the user systems 112. The tenant data and the system data may be stored in various databases, such as one or more Oracle™ databases.

The application platform 118 includes an application setup mechanism 238 that supports application developers' creation and management of applications, which may be saved as metadata into tenant data storage 122 by the save routines 236 for execution by subscribers as one or more tenant process spaces 204 managed by the tenant management process 210, for example. Invocations to such applications may be coded using PL/SOQL 234 that provides a programming language style interface extension to the API 232. Some embodiments of PL/SOQL language are discussed in further detail in U.S. Pat. No. 7,730,478, filed Sep. 21, 2007, entitled, "Method and System for Allowing Access to Developed Applications Via a Multi-Tenant On-Demand Database Service," which is incorporated herein by reference. Invocations to applications may be detected by one or more system processes, which manage retrieving the application metadata 216 for the subscriber, making the invocation and executing the metadata as an application in a virtual machine.

Each application server 200 may be communicably coupled to database systems, e.g., having access to the system data 125 and the tenant data 123, via a different network connection. For example, one application server $200_1$ might be coupled via the network 114 (e.g., the Internet), another application server $200_{N-1}$ might be coupled via a direct network link, and another application server $200_N$ might be coupled by yet a different network connection. Transfer Control Protocol and Internet Protocol (TCP/IP) are typical protocols for communicating between application servers 200 and the database system. However, it will be apparent to one skilled in the art that other transport protocols may be used to optimize the system depending on the network connection used.

In certain embodiments, each application server 200 is configured to handle requests for any user associated with any organization that is a tenant. Because it is desirable to be able to add and remove application servers from the server pool at any time for any reason, there is preferably no server affinity for a user and/or organization to a specific application server 200. In one embodiment, therefore, an interface system implementing a load balancing function (e.g., an F5

Big-IP load balancer) is communicably coupled between the application servers 200 and the user systems 112 to distribute requests to the application servers 200. In one embodiment, the load balancer uses a least connections algorithm to route user requests to the application servers 200. Other examples of load balancing algorithms, such as round robin and observed response time, also can be used. For example, in certain embodiments, three consecutive requests from the same user could hit three different application servers 200, and three requests from different users could hit the same application server 200. In this manner, the system 116 is multi-tenant, wherein the system 116 handles storage of, and access to, different objects, data and applications across disparate users and organizations.

As an example of storage, one tenant might be a company that employs a sales force where each salesperson uses the system 116 to manage his or her sales process. Thus, a user might maintain contact data, leads data, customer follow-up data, performance data, goals and progress data, etc., all applicable to that user's personal sales process (e.g., in the tenant data storage 122). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by the system 116 that are allocated at the tenant level while other data structures might be managed at the user level. Because a MTS might support multiple tenants including possible competitors, the MTS should have security protocols that keep data, applications, and application use separate. Also, because many tenants may opt for access to a MTS rather than maintain their own system, redundancy, up-time, and backup are additional functions that may be implemented in the MTS. In addition to user-specific data and tenant specific data, the system 116 might also maintain system level data usable by multiple tenants or other data. Such system level data might include industry reports, news, postings, and the like that are sharable among tenants.

In certain embodiments, the user systems 112 (which may be client systems) communicate with the application servers 200 to request and update system-level and tenant-level data from the system 116 that may require sending one or more queries to the tenant data storage 122 and/or the system data storage 124. The system 116 (e.g., an application server 200 in the system 116) automatically generates one or more structured query language (SQL) statements (e.g., one or more SQL queries) that are designed to access the desired information. The system data storage 124 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table."

In some multi-tenant database systems, tenants may be allowed to create and store custom objects, or they may be allowed to customize standard entities or objects, for example by creating custom fields for standard objects, including custom index fields. Systems and methods for creating custom objects as well as customizing standard objects in a multi-tenant database system are described in further detail in U.S. Pat. No. 7,779,039, filed Apr. 2, 2004, entitled "Custom Entities and Fields in a Multi-Tenant Database System," which is incorporated herein by reference. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

In the environment of a multi-tenant database system, such as system 116, users at one or more of the organizations may wish to share the same material or content (e.g., a sales opportunity, a follow up correspondence, a proposal, a promotion, or a pitch) with multiple potential recipients (e.g., different customers, clients, or prospects; or different people at the same customer, client, or prospect). This material, content, file, or information can be stored or maintained in the system 116 (e.g., Salesforce Content Repository, tenant data storage 122, system data storage 124) and accessible via a suitable link that is emailed, texted, or the like, to each recipient. Not all potential recipients are equally situated. For example, only one or two, out of many, may have decision-making authority to act on (e.g., accept or reject) a proposal. In such cases, the CRM user would prefer to know which potential recipients actually accessed the shared material or content, how many times, how long, etc.

To provide for this, according to some embodiments, in the environment of a multi-tenant database system accessible by a plurality of organizations, such as system 116 shown and described with respect to FIGS. 1 and 2, systems and methods are provided for monitoring access of the shared content, material, or file via unique links generated for each email, text, or other message (or message recipient) sent out by the CRM user, for example, interacting with system 116 via a respective user system 112.

The systems and methods abstract the creation of links to files or materials to be shared. In some embodiments, the systems and methods provide for the creation of separate or individualized links to the shared material or content. Each individualized link is included in the email, text, or the like, sent to a respective recipient by the CRM user, thereby associating that link with the respective recipient. While all links direct or take the respective recipients to the same shared file or material stored or maintained in the system 116, access by each recipient (e.g., through a respective user system 112) can be tracked by monitoring activity occurring through the respective individualized link. In this way, the CRM user understands who is previewing or downloading the shared materials or content, how long, how often, etc. The CRM user can then act on this, for example, by sending follow up emails, texts, messages, or making a telephone call, etc., thereby potentially increasing the chance of making a sale, closing a transaction, landing a deal, etc. In some embodiments, the link creation logic or capability is provided, supported, or initiated from a user interface add-on (e.g., Salesforce UI) displayed within a message service provider (e.g. Outlook, Gmail, and/or the like).

Monitoring Access of a Shared File Via Unique Links

Figure 3:
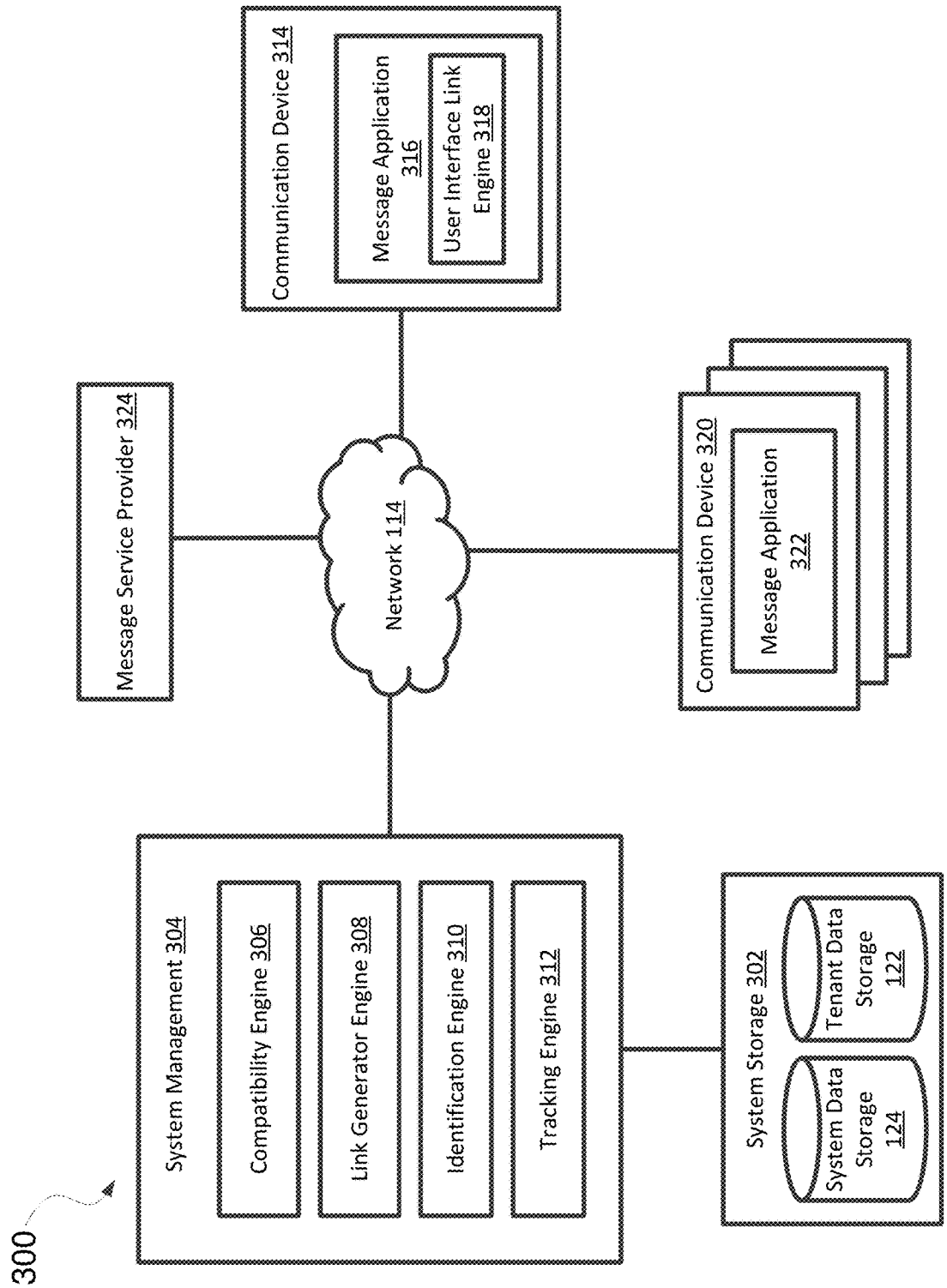
FIG. 3 illustrates a block diagram of a system for monitoring access of shared material via unique links according to some embodiments.

FIG. 3 illustrates a block diagram of a system 300 for monitoring access of a shared file, content, or other material via unique links according to some embodiments.

In some embodiments, system 300 is implemented in one or more computing devices, such as servers, desktops, laptops, notebooks, smartphones, and the like. Each computing device may include one or more processors coupled to or in communication with memory. Operation of the one or more computing devices is controlled by the processors. The processors may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing devices.

Memory may be used to store software executed by computing devices and/or one or more data structures used during operation of computing devices. Memory may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

For each computing device of system 300, the processors and/or memory may be arranged in any suitable physical arrangement. In some embodiments, processor and/or memory may be implemented on a same board, in a same package (e.g., system-in-package), on a same chip (e.g., system-on-chip), and/or the like. In some embodiments, processor and/or memory may include distributed, virtualized, and/or containerized computing resources. Consistent with such embodiments, processor and/or memory may be located in one or more data centers and/or cloud computing facilities. In some embodiments, memory may include non-transitory, tangible, machine readable media that includes executable code that when run by one or more processors may cause the one or more processors implementing system 300 to perform the operations methods described in further detail herein.

As shown in FIG. 3, system 300 includes a system storage 302, a system management 304, a communication device 314, one or more communication devices 320, and a message service provider 324 that communicate with one other, e.g., via a network 114 (with reference to FIG. 1) or other suitable communications network or channels. In some embodiments, one or more of system storage 302, system management 304, communication devices 314, 320, and message service provider 324 may be incorporated or implemented, in whole or in part, by or into portions of systems 112, 116, 200, etc. of FIGS. 1 and 2.

System storage 302 provides or supports storage spaces for the storing of files, information, data, etc. In some embodiments, system storage 302 can include, incorporate, or be implemented by system data storage 124 and tenant data storage 122 in multi-tenant system 116, as shown and described with reference to FIGS. 1 and 2, which provides or supports storage spaces (e.g. content repositories) for a web-based CRM service system for, and is accessible within or by, organizations, their employees, and their customers, clients, etc. For each organization, the data information, files, etc., stored in system storage 302, can relate to or be associated with that organization's employees, customers, clients, etc. Such data or information can include, for example, contact information (customer's email, phone number, address), past and pending businesses with the organization, customer's persons of contact within the organization, and/or the like. The data or information stored in system storage 302 can also include one or more files or other information that an organization (or its employees, such as sales or customer service representatives) wishes or desires to share with its customers, clients, potential leads, etc. This can include, for example, a business proposal, marketing materials, presentation or pitch materials, and/or the like. Users associated with an organization (e.g., employees, customers, clients, vendors, etc.) may interact with the system storage 302 using respective user systems 112 (as described with reference to FIGS. 1 and 2) to access, store, and update data, information, files, etc.

System management 304 provides or implements a system for managing and monitoring the access of a file or other information (e.g., business proposal, marketing materials, presentation or pitch materials) stored in system storage 302 and to be shared with multiple, customers, clients, potential leads, etc. of an organization. According to some embodiments, this is accomplished with the generation and use of unique links for respective customers, clients, potential leads, etc. These intended recipients or targets of the material to be shared may receive the respective unique links, for example, in emails, texts, or any other suitable message form. In some embodiments, as shown, system management 304 includes a compatibility engine 306, a link generator engine 308, an identification engine 310, and a tracking engine 312.

Compatibility engine 306 provides or supports compatibility of system 300 with the message service (e.g., email, text, or any other suitable message format) by which unique links to a shared file or material are distributed or sent out. In some embodiments, compatibility engine 306 can determine a type of message application 316 that is installed on a communication device 314, by or through which a user (e.g., CRM user, such as a sales or customer service representative at an organization) generates and sends out one or more messages with respective unique links. In some embodiments, compatibility engine 306 may generate, transfer, and support a user interface link engine 318 (e.g., Salesforce add-on) that is compatible with the message application 316 on the communication device 314. In some examples, a CRM user, interacting through the communication device 314, may send a request to system management 304 to receive the user interface for generating unique links to a shared file. Compatibility engine 306 determines the type of the email application of the CRM user's device, generates and transfers the user interface for generating unique links to a shared file that is compatible with email application of the CRM user's device. In some examples, within an organization, system management 304 may automatically detect different types of message applications installed in the respective communication devices 314 of each user of the organization and transfer their compatible user interfaces for generating unique links to files stored in the organization's system storage 302.

Link generator engine 308 provides or supports generation of unique links to a file, content, information, or other material stored in system storage 302. The unique links can be generated by, for example, encryption algorithms, indexing algorithms, hash functions, appending string, random number generation, or any other suitable algorithm or technique. In some embodiments, each unique link to the file or material may be generated by encrypting the file's location path on system storage 302 with the respective recipient or viewer. In some examples, the encrypting of the file's location path on system storage 302 with the respective recipient or viewer associated with the unique link can be accomplished, at least in part, by appending the recipient's data available on system storage 302 to the file's location path on system storage 302. In some examples, the encrypting of the file's location path on system storage 302 with the respective recipient or viewer includes performing or more indexing encryption methods or operations. In some examples, the encrypting of the file's location path on system storage 302 with the respective recipient or viewer includes using a random number that is uniquely and specifically generated for the respective recipient or viewer by a random number generator. In some examples, generating the unique links includes encrypting information using SHA256 encryption, for example on Salesforce org ID and the link's record ID (which is unique). The unique links are provided or transmitted to the communication device 314 at which a CRM user (e.g., sales or customer service representative at an organization) generates email, texts, or other suitable messages for inviting respective recipients to view the shared information or file. Each individualized link is included in the email, text, or other message sent to a respective recipient by the CRM user, thereby associating that link with the respective recipient. While all links direct or take the respective recipients to the same shared file or material stored or maintained in system storage 302, access by each recipient (e.g., using a respective communication device 320) can be tracked by monitoring activity occurring through the respective individualized link. In some embodiments, system management 304, in conjunction with system storage 302 and/or communication device 314, supports or maintains information to relate each recipient with the respective unique link.

Identification engine 310 provides or supports identifying the recipients who view, open, access, download, forwarded, and/or otherwise interact with the shared content, file, information, or material stored in system storage 302. In some embodiments, identification engine 310 may determine each recipient's identity by decrypting the unique link, extracting the recipient's data from the decrypted unique link, and identifying the recipient based on the extracted data. In some embodiments, identification engine 310 may determine each recipient's identity by correlating, matching, or cross-checking the recipient with the unique link by which the recipient accesses the shared file or information. The shared information or file's location path in the system storage 302, data related to each recipient of a unique link to the information or file, and the generated unique link for each recipient are stored in a database in system storage 302. When a recipient accesses the shared file or material via her/his unique link, an acknowledgement data packet is sent back to system management 304 via network 114. As such, identification engine 310 may look up the identity of the recipient associated with the accessed unique link from the database in system storage 302.

Tracking engine 312 provides or supports tracking or monitoring the access to the shared file or material stored in system storage 302 via each unique link. In some embodiments, tracking engine 312 operates or works in conjunction with identification engine 310. In some embodiments, when a recipient (for example, interacting through communication device 320) accesses the shared file/material via her/his unique link, an acknowledgement data packet is sent from the communication device 320 to system management 304 via network 114. After identification engine 310 has identified the recipient using the unique link, tracking engine 312 may store, update, and keep track of the data related to the accessing of the shared file by that recipient. In some examples, tracking engine 312 may keep track of a time of the access of the shared file/material, a device 320 from which the shared file/material has been accessed, a duration of the access, and the level or engagement or interaction with the shared file, such as, for example, downloading the shared file, filling out a form, watching a presentation video, forwarding the unique link, and/or the like. Tracking engine 312 may then add or store information for the tracked activity to the recipient's data in system storage 302.

Communication device 314 is a communication device used by a CRM user (e.g., sales or customer service representative) to generate and send emails, texts, or any other suitable message for inviting respective recipients to view or access the shared material, file, content, or other information (e.g., business proposal, marketing materials, presentation or pitch materials) stored in system storage 302. In some embodiments, communication device 314 is implemented or consistent with any of user systems 112 described with reference to FIGS. 1 and 2. In some embodiments, the communication device 314 includes or has installed thereon a suitable message application 316 (e.g., Outlook, Gmail application).

A user interface link engine 318 operates on the communication device 314, in conjunction with the message application 316, to coordinate and insert respective unique links into each message that is sent out for inviting respective recipients to view or access the shared material, file, or other information. In some embodiments, the user interface link engine 318 cooperates or works in conjunction with the link generator engine 308 on system management 304 to generate and receive the unique links. In some embodiments, the user interface link engine 318 may include or implement a user interface that is provided as an add-on to the message application 316, for example, in the form of a button, icon, drop-down menu, etc. If the user of device 314 would like to track and monitor the access and viewing of shared materials or information by a recipient of a particular message, the add-on allows the user to choose such option while composing the message. In some embodiments, this causes the user interface link engine 318 to obtain a unique link from link generator engine 308, which it then inserts into the message to allow the intended recipient to access the shared file, material, or information. In some embodiments, while each link is unique to a particular message or intended recipient, the unique links are hidden or not made visible to the recipients; instead, the link can be presented in a form that appears the same for all recipients of messages, for example: "Please view the proposal here," where "here" takes the respective recipient to the shared material via the unique link.

The unique links allows the CRM user to understand which recipients are previewing or downloading the shared materials, how long, how often, etc. The CRM user can then act on this, for example, by sending follow up emails, thereby potentially increasing the chance of making a sale, closing a transaction, landing a deal, etc.

Communication devices 320 are the communication device used by various recipients to receive respective emails, texts, or other messages inviting them to view the shared content, materials, or information (e.g., business proposal, marketing materials, presentation or pitch materials) stored in system storage 302. In some embodiments, each communication device 320 is implemented or consistent with any of user systems 112 described with reference to FIGS. 1 and 2. In some embodiments, each communication device 320 includes or has installed thereon a suitable message application 322 (e.g., Outlook, Gmail application). After receiving the respective messages, each containing a respective unique link, the recipients can use the communications devices 320 to access or view the shared material, file, or information.

Message service provider 204 may provide, support, or facilitate the service by which messages are created, sent, and received through communication devices 314, 320 operating through message applications 316 and 322 via network 114. In some examples, message service provider 204 may be Outlook, Gmail and/or the like service, and message applications 316 and 322 may be Outlook, Gmail and/or the like message applications.

According to some embodiments, all or a portion of system 300 may run on or be incorporated in system 116, with tenant data storage 122, system data storage 124, program code 126, process space 128. In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Figure 4:
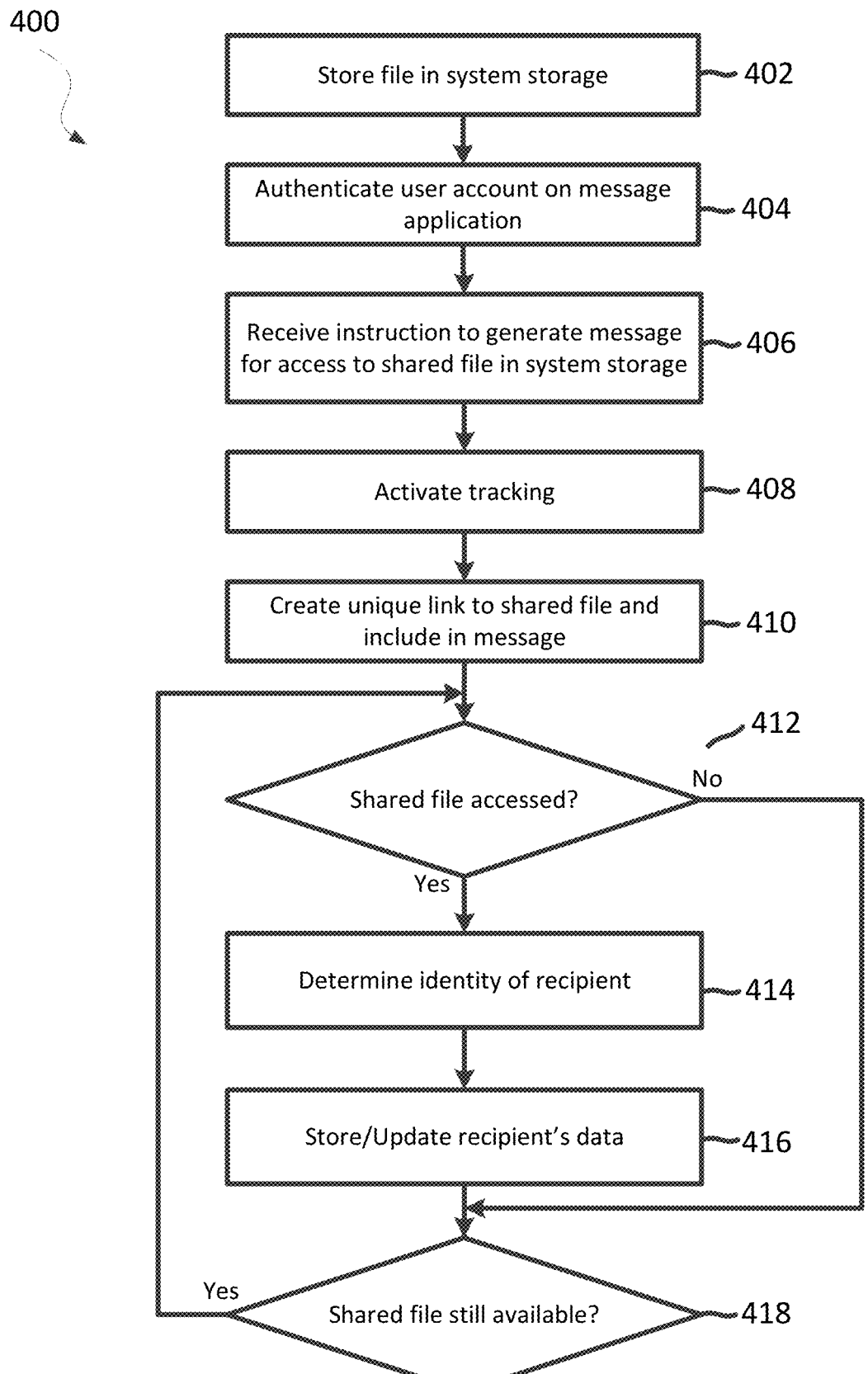
FIG. 4 illustrates a simplified diagram of a process flow for monitoring access of shared material via unique links according to some embodiments.

FIG. 4 illustrates a simplified diagram of a process flow 400 for monitoring access of a shared file via unique links according to some embodiments. According to some embodiments, one or more of the processes 402-418 of process flow 400 may be implemented, at least in part, in the form of executable code stored on non-transitory, tangible, machine-readable media that when run by one or more processors may cause the one or more processors to perform one or more of the processes 402-418. According to some embodiments, process flow 400 can be performed by one or more computing devices illustrated or described with respect to the systems 100, 200, and 300 of FIGS. 1, 2, and 3, respectively, including system storage 302, system management 304, communication device 314, one or more communication devices 320, message server provider 324, and user interface link engine 318. Aspects of processes 402-418 of process flow 400 have been covered in the description for FIGS. 1, 2, and 3; and additional aspects are provided below. According to some embodiments, all or a portion of the process flow 400 may be performed for each unique link to a shared file/information for which monitoring access to the shared file/information via unique links could be desired.

At a process 402, a user or representative of an organization subscribed to the CRM system 116 may store a file, content, material, or other information in system storage 302. Such CRM user can interact with system 116 using, for example, communication device 314. In some examples, the file, content, material, or other information may be a document, a multimedia file, a link to a document and/or multimedia file, and/or the like that the CRM user wishes to share with a number of recipients who are, for example, customers, clients, potential leads, etc. for the organization.

At a process 404, system 300 may authenticate the CRM user's organization message account on message application 316, for example, by log-in with user identification, password, and/or other access credentials.

At a process 406, system 300 receives instructions from the CRM user (e.g., using communication device 314 with message application 316) to generate an email, text, or other message by which the user invites a respective recipient to view or access the shared file or material stored in system storage 302. In some embodiments, user interface link engine 318 may already be installed and available on message application 316. In some embodiments where user interface link engine 318 is not present or installed on message application 316, communication device 314 contacts system management 304 via network 114 to request a user interface compatible with message application 316 (e.g. by sending a request from a menu on message application 316). Compatibility engine 306 may detect the type of message application 316 and generate and transfer user interface link engine 318 that is compatible with the type of message application 316 being used on communication device 314.

At a process 408, user interface link engine 318 receives instructions to activate the tracking and monitoring of each recipient accessing, viewing, or interaction with the shared content, file, material, or information stored on system storage 302. In some examples, when the user is composing a message to a recipient, the user may activate the tracking by "checking" a track activation button, menu, or other interactive feature provided or supported on the message application by user interface link engine 318. In some embodiments, the CRM user may select multiple recipients to activate tracking and monitoring of access to the shared file, material, or information. In such cases, for each recipient or message, the user interface link engine 318 coordinates or works with link generator engine 308 of system management 304 to request, generate, and receive a unique link for inclusion in the respective message. In some embodiments, user interface link engine 318 sends the list of recipients and the file's location path in the system storage 302, to system management 304.

At a process 410, unique links are created or generated by link generator engine 308 at system management 304. In some embodiments, each unique link can be generated based on the file's location path in the system storage 302 and each recipient's data stored in the system storage 302. In some embodiments, link generator engine 308 at system management 304 generates customized messages for each recipient with respective unique links. In some embodiments, the user interface link engine 318, as an add-on to the message application 316, generates the messages for each recipient. The messages are sent out, for example, facilitated by message service provider 324, to the respective recipients, who receive the messages at respective communication devices 320. If any recipient elects to access or view the shared information or file, the recipient will do so using the respective unique link.

At a decision process 412, tracking engine 312 at system management 304 determines whether the shared information or file stored in system storage 302 has been accessed. For any recipient invited to view or access the shared information or file, access is provided or enabled via the respective unique link included in the message sent to that recipient. In some embodiments, the availability of access to the shared content, material, or file is limited, for example, in time (e.g., one week), number (e.g., first 1000 accesses), or until a particular number of actions have been taken in connection with the shared information (e.g., first 100 recipients to accept a proposal or offer set forth in the shared file). If at decision process 412 the tracking engine 312 determines that the information or file has not been accessed, process flow 400 proceeds to decision process 418, where system management 304 considers whether the shared information or file is still available for access. If not, process flow 400 is terminated. Otherwise, process flow 400 returns to decision process 412, where tracking engine 312 continues to monitor access to the shared information or file.

If tracking engine 312 determines at decision process 412 that the shared information or file has been accessed, then at process 414, identification engine 310 determines the identity of the recipient who accessed the shared file, content, material, or information based on the unique link. In some embodiments, identification engine 310 accesses a database or retrieves information that correlates the unique link to a particular recipient. In some embodiments, where a recipient's data has been used to generate the respective unique link, identification engine 310 can decrypt the unique link itself to obtain data of (e.g., identity of) the recipient.

At a process 416, tracking engine 312 stores or updates data or information on the recipient who has accessed, viewed, downloaded, forwarded, and/or otherwise interacted with the shared file or information on system storage 302. In some examples, tracking engine 312 may keep track of the number of instances (e.g., once, twice, 15 times) that the user accessed the shared file or information, the duration of access (e.g., two minutes, 20 minutes, 2 hours) for each instance, the portions or locations of the shared file, material, or content that have been accessed (e.g., introductory section, slides 3-10, executive summary), any interaction with the shared file, material, or content, such as downloading the shared file or material, filling out a form, forwarding the unique link, watching a presentation video and/or the like. Tracking engine 312 may then add the tracked activity to the recipient's data in system storage 302.

In some embodiments, one or more actions illustrated in processes 402-418 may be performed for any number of unique links. It is also understood that additional processes may be performed before, during, or after processes 402-418 discussed above. It is also understood that one or more of the processes of process flow 400 described herein may be omitted, combined, or performed in a different sequence as desired.

Figure 5:
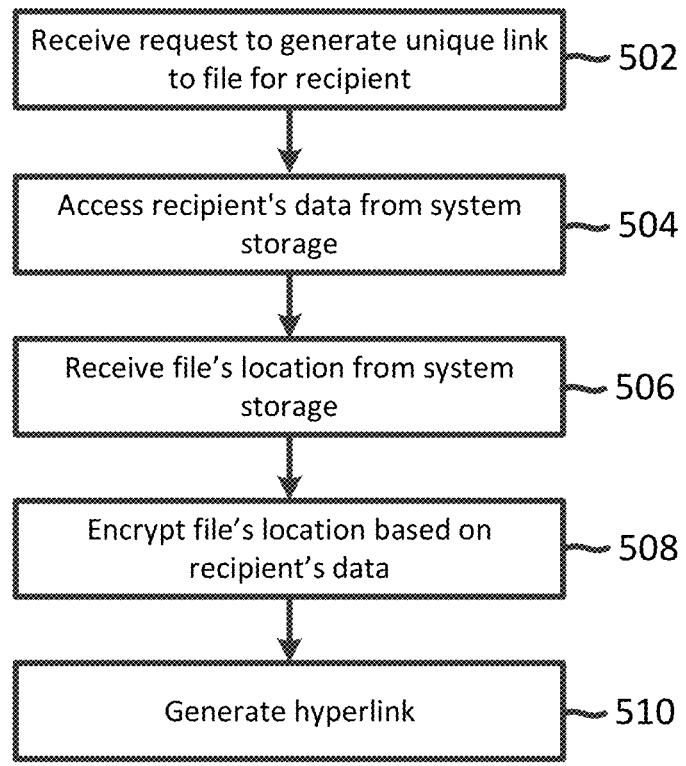
FIG. 5 illustrates a simplified diagram of a process flow for generating a unique link according to some embodiments.

FIG. 5 illustrates a simplified diagram of a process flow 500 for generating a unique link according to some embodiments. One or more of processes 502-510 of process flow 500 may be implemented, at least in part, in the form of executable code stored on non-transitory, tangible, machine-readable media that when run by one or more processors may cause the one or more processors to perform one or more of the processes 502-510. In some embodiments, all or a portion of the process flow 500 may be performed by link generator engine 308. In some embodiments, process flow 500 may be performed as part of processes 408 and 410 of process flow 400 of FIG. 4. In some embodiments, process flow 500 can be performed by one or more computing devices in systems or diagrams 100, 200, and 300 of FIGS. 1, 2, and 3, respectively. In some embodiments, process flow 500 generates a unique link to a shared file or material, for a recipient. Aspects of processes 502-510 of process flow 500 have been covered in the description for FIGS. 1, 2, 3, and 4; and additional aspects are provided below.

At a process 502, link generator engine 308 receives a request to generate a unique link to a shared file or material in storage system 302. In some embodiments, this request may originate from user interface link generator 318. In some embodiments, a user (e.g., sales or customer representative at an organization) composing an email, text, or other message to a recipient in message application 315 on communication device 314, may choose to add or include a link to the file or material stored on storage system 302. In some embodiments, the user may trigger the request to generate a unique link to the file or material by checking a button on use interface link generator 318. User interface link generator 318 may then send the request to generate a unique link to the file to link generator engine 308 via network 114.

At a process 504, link generator engine 308 accesses the recipient's data available on system storage 302. In some examples, the recipient's data may include an email address, office phone number, mobile number, employee number, and/or the like.

At a process 506, link generator engine 308 receives the shared material or file's location path in system storage 302. In some examples, the shared file's location path may look like "myorg://4830-6962-0602/file", where "4830-6962-0602" is the file number.

At a process 508, link generator engine 308 encrypts the shared file's location path based on the recipient's data available on system storage 302. In some examples, encrypting the file's location path on system storage 302 with the recipient of the unique link to the file can be accomplished with indexing encryption algorithms, hash function algorithms, unique random number generated by a random number generator, and/or the like. In some examples, encrypting the file's location path on system storage 302 with the recipient of the unique link to the file can be accomplished by appending the recipient's data available on system storage 302 to the file's location path on system storage 302. In some examples, the encrypted file's location path based on the recipient's data by appending with the recipient's data, may look like "myorg://4830-6962-0602/file+joe.smith@clientcompany.com", where "file+joe.smith@clientcompany.com" is the recipient's email address.

At a process 510, link generator engine 308 generates a unique hyperlink to the shared file in storage system 302. The hyperlink to the shared file may be masked to the encrypted shared file's location path with the recipient's data.

In some embodiments, one or more actions illustrated in processes 502-510 may be performed for any number of input received by the CRM system. It is also understood that additional processes may be performed before, during, or after processes 502-510 discussed above. It is also understood that one or more of the processes of process flow 500 described herein may be omitted, combined, or performed in a different sequence as desired.

Certain examples of the present disclosure also relate to an apparatus for performing the operations herein. This apparatus may be constructed for the intended purposes, or it may include a general-purpose computer selectively activated or reconfigured by a computer program stored in the computer. Such a computer program may be stored in a computer readable storage medium, such as, but not limited to, any type of disk including floppy disks, optical disks, CDROMs, and magnetic-optical disks, read-only memories (ROMs), random access memories(RAMs), EPROMs, EEPROMs, magnetic or optical cards, or any type of media suitable for storing electronic instructions.

Although illustrative embodiments have been shown and described, a wide range of modifications, changes and substitutions is contemplated in the foregoing disclosure and in some instances, some features of the embodiments may be employed without a corresponding use of other features. One of ordinary skill in the art would recognize many variations, alternatives, and modifications. Thus, the scope of the disclosure should be limited only by the following claims, and it is appropriate that the claims be construed broadly and in a manner consistent with the scope of the embodiments disclosed herein.

What is claimed is:

1. A method for monitoring access of shared material, the method comprising:

storing the shared material in a memory of a computer system;

receiving, at one or more processors of the computer system, an instruction to generate a plurality of messages, each message for providing a respective recipient with access to the shared material;

for each message, generating, at the one or more processors, a respective link to the shared material by encrypting a file path for the shared material with data relating to the respective recipient, wherein the respective link is unique and associated with the particular message; and monitoring, at the one or more processors, access to the shared material by each message recipient via the respective unique link by identifying a message recipient who has accessed the shared material by decrypting the file path for the shared material to recover the data relating to the respective recipient.

2. The method of claim 1, wherein each message is one of an email message or a text message.

3. The method of claim 1, wherein monitoring comprises:

determining that the shared material has been accessed; and using the respective unique link, identifying the message recipient who has access the shared material.

4. The method of claim 1, wherein the shared material comprises at least one of a sales opportunity, a follow up correspondence, a proposal, a promotion, or a pitch.

5. A non-transitory machine-readable medium comprising executable code which when executed by one or more processors associated with a computer are adapted to cause the one or more processors to perform a method for monitoring access of shared material, the method comprising:

storing the shared material in a system storage;

receiving an instruction to generate a plurality of messages, each message for providing a respective recipient with access to the shared material;

for each message, generating, at the one or more processors, a respective link to the shared material by encrypting a file path for the shared material with data relating to the respective recipient, wherein the respective link is unique and associated with the particular message; and monitoring, at the one or more processors, access to the shared material by each message recipient via the respective unique link by identifying a message recipient who has accessed the shared material by decrypting the file path for the shared material to recover the data relating to the respective recipient.

6. The non-transitory machine-readable medium of claim 5, wherein each message is one of an email message or a text message.

7. The non-transitory machine-readable medium of claim 5, wherein monitoring comprises:

determining that the shared material has been accessed; and using the respective unique link, identifying the message recipient who has access the shared material.

8. The non-transitory machine-readable medium of claim 5, wherein the shared material comprises at least one of a sales opportunity, a follow up correspondence, a proposal, a promotion, or a pitch.

9. A system for monitoring access of shared material stored in a system storage, the system comprising:

a memory containing machine readable medium storing machine executable code; and one or more processors coupled to the memory and configurable to execute the machine executable code to cause the one or more processors to:

receive an instruction to generate a plurality of messages, each message for providing a respective recipient with access to the shared material;

for each message, generating, at the one or more processors, a respective link to the shared material by encrypting a file path for the shared material with data relating to the respective recipient, wherein the respective link is unique and associated with the particular message; and monitoring, at the one or more processors, access to the shared material by each message recipient via the respective unique link by identifying a message recipient who has accessed the shared material by decrypting the file path for the shared material to recover the data relating to the respective recipient.

10. The system of claim 9, wherein each message is one of an email message or a text message.

11. The system of claim 9, wherein monitor comprises:

determine that the shared material has been accessed; and using the respective unique link, identify the message recipient who has access the shared material.

12. The system of claim 9, wherein the shared material comprises at least one of a sales opportunity, a follow up correspondence, a proposal, a promotion, or a pitch.

* * * * *